Feb. 23, 1965 F. L. ROGERS, JR 3,171,107

WIDE-RECORD NARROW-READ MAGNETIC HEAD

Filed July 3, 1961

INVENTOR.

FRED L. ROGERS JR.

BY *Karl A. Okralik*

ATTORNEY.

3,171,107
Patented Feb. 23, 1965

3,171,107

WIDE-RECORD NARROW-READ MAGNETIC HEAD

Fred L. Rogers, Jr., Lexington, Ky., assignor to International Business Machines Corporation, New York, N.Y., a corporation of New York Filed July 3, 1961, Ser. No. 121,719
6 Claims. (Cl. 340—174.1)

This invention relates to the magnetic recording and reading of information on a magnetic medium and more particularly to a magnetic head device effective to record information on a track of width greater than the width of a track over which the head is effective to read information from the medium.

In certain systems requiring information storage, an effective medium for storing information is a strip of magnetic material applied to a ledger card, for example. Such information may be recorded and read in bits by a magnetic head device responsive to pulsed electrical energization to produce a magnetic field effective to magnetize certain portions of the medium. The head is effective over a certain track width and provision is made for relative movement between the head and medium to record information along the strip. During each recording, all information previously recorded along the width of the track which passes relative to the head, is erased and new information is recorded on the medium.

It has been found difficult to simply maintain an exact lateral alignment of the head with respect to a recording track for successive passes of the head. For equal widths of recording track and recording strip, a lateral misalignment of head with respect to the strip would result in an effective recording portion of the head being beyond the lateral bounds of the track with consequent diminution of recording width and also diminution of signal in a reading operation.

To overcome this difficulty, it has been found expedient to provide a magnetic strip width greater than the head recording and reading width, with an intended recording track substantially equidistantly spaced from opposite sides of the strip to allow for possible misalignment of head and recording strip.

However, with this arrangement, due to misalignment of the head device with respect to the intended track, it is possible that during a subsequent recording operation the bits of information previously recorded are not completely erased. Thus, in a reading operation wherein the head is slightly misaligned and is passed along the track of such previously recorded information, the remaining unerased bits of previously recorded information as well as that recorded during the subsequent recording operation are read. This is undesirable since it produces "noise" and may result in erratic performance of the system.

The latter difficulty has been very effectively overcome by the provision of magnetic heads effective to record over a width greater than its reading width and even with a slight lateral misalignment of the head with respect to the strip, the reading track is within the bounds of the last previous recording. In some applications, however, additional considerations are important. Where the space allowed for the head is small and it is moved along the strip, and rapidly accelerated from standstill, the size and mass of the head become very important, with low size and mass being highly desirable. Also, in cases wherein the head surface is in actual contact with the recording medium, the head surface undergoes considerable wear since the usual magnetic reading material is highly abrasive. Thus, the head must be able to operate without change for prolonged periods even with substantial wear of the contacting surface.

It is therefore a principal object of this invention to provide a magnetic head effective to record information on a magnetic medium over a wider track than its reading track and which is of a novel and simple construction conducive to small size and low head mass to facilitate its rapid acceleration.

It is another object of this invention to provide a novel magnetic head capable of undergoing considerable wear without adverse operating effects to facilitate actual contact between the head and a recording medium during a recording or reading operation.

The foregoing and other objects, features and advantages of the invention will be apparent from the following more particular description of a preferred embodiment of the invention, as illustrated in the accompanying drawings.

Figure 1:
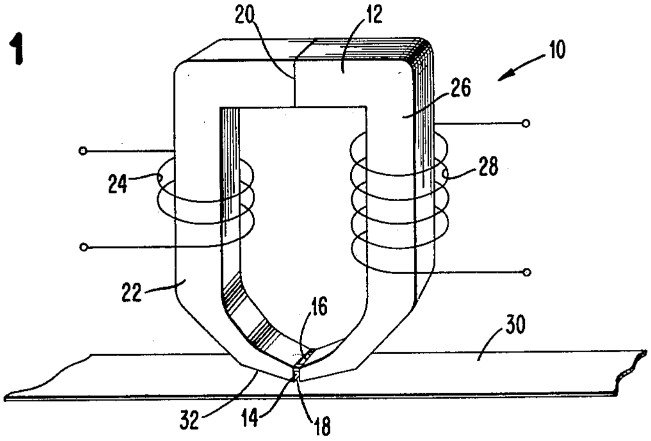
FIGURE 1 is a perspective view of a magnetic head incorporating this invention.

Referring now to the drawings for a detailed description of the invention, in FIGURE 1, 10 represents an entire magnetic head in which the present invention is incorporated. The head 10 includes a magnetic core 12 which may be made of a plurality of laminations of suitable magnetic material such as soft iron and being generally in the shape of the letter O. Each lamination is open at one end whereby in the aggregate the open portions form a pair of opposing faces 14 and 16 to form a gap 18. A portion of the core remote from the gap 18, may also be split as shown at 20, to facilitate fabrication during manufacture.

One leg 22, of core 12 has wound thereon a recording winding 24 and another leg 26 of the core 12 has a read winding 28 wound thereon. The reading winding 28 is of relatively many turns as compared with the number of turns of recording winding 24. Typically, the read winding may have approximately 800 turns and the record winding approximately 400 turns, center tapped whereby only 200 turns thereof are effective during a writing operation.

Energization of the write winding produces a magnetomotive force effective to pass a magnetic flux through core 12 and gap 18. Some of the flux so produced, fringes at the gap 18, i.e., passes from one face to the other along a curved path out of the space of the gap 18 and is effective to pass through and record bits of information on a magnetic medium such as shown at 30 adjacent to a pole face 32 of the core 12. The medium 30 may be an oxide or oxides of iron in a suitable binder adhered to a paper or other suitable material. Reciprocally, the flux produced by a magnetized portion of the medium 30 is effective to produce a changing magnetic flux in core 12 in response to relative movement between the medium and head whereby an electrical potential is induced in the windings on the cores. Thus, the winding 24 is effective to write information on the medium 30 and the winding 28 is effective to read the information recorded on medium 30.

Figure 2:
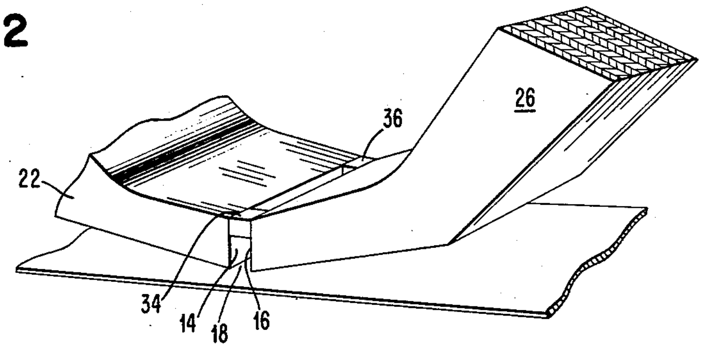
FIGURE 2 is an enlarged, broken-away perspective view of the magnetic head shown in FIGURE 1.
Figure 3:
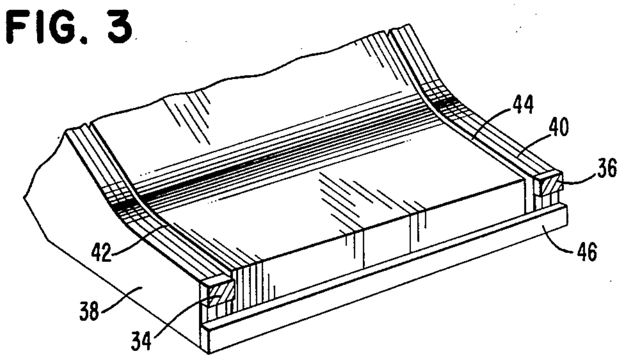
FIGURE 3 is an enlarged, broken-away perspective view of a portion of the magnetic head, showing the detailed construction of certain parts thereof.

In accordance with a feature of this invention, the head 10 is constructed whereby the width over which it is effective to read information is less than that over which it is effective to record. As shown more clearly in FIGURES 2 and 3, to achieve this result, a pair of magnetic members 34 and 36 having a magnetic permeability considerably greater than the other space between the faces 14 and 16 to present a low reluctance magnetic path are disposed in gap 18. These members extend completely between faces 14 and 16 and are at respective extremities of the gap width. Magnetic core portions 38 and 40 of the head along which members 34 and 36 extend, respectively, are disposed on opposite sides of the width of the main body of the core and separated therefrom by nonmagnetic members 42 and 44 which may be of brass or other suitable material. In the contemplated usage of the head 10, the pole face 32 is in actual contact with the recording medium which typically is quite abrasive. To facilitate long life of the head 10 notwithstanding considerable wear of pole face 32 by abrasion with the recording medium, the members 34 and 36 are disposed in a portion of the gap 18 remote from the pole face 32.

For maintaining the spacing between faces 14 and 16 constant and for making the head 10 a firm unitary member, the gap 18 is preferably filled with a nonmagnetic, adhesive material such as a suitable epoxy resin such as shown at 46.

In the operation of the head, the record winding 24 is energized as the head is moved relative to the medium 30. The intensity of such energization is greater than that required to magnetically saturate the members 34 and 36, i.e., the magnetomotive force exceeds that required to pass the maximum amount of flux which these members can accommodate. The excess flux passes between the faces 14 and 16 along the width portion coextensive with the members 34 and 36 as well as the width between these members and thus, the fringing flux, hereinabove described, is effective to record information on the medium 30 along the entire width of the head.

For reading information on the medium 30 by the head 10, the winding 24 is de-energized and the relative movement between the head and the medium 30 causes the flux of the magnetized portions of the medium 30 to link the faces 14 and 16 and cause a time rate of change of flux in core 12. This induces a potential in the read winding 28. However, the magnitude of the flux due to the magnetized portions of medium 30 is relatively low and in accordance with this invention, the saturation flux of members 34 and 36 is greater than the value of flux at the widths of core portions 38 and 40. Accordingly, the width portions of the head coextensive with members 34 and 36 are magnetically bypassed and substantially no magnetic fringing flux appears along these portions of the head. As a consequence, the head is effective to read magnetically recorded information along only the width of the head between members 34 and 36.

From the foregoing description it is clear that a magnetic head according to this invention is simple and relatively easy to construct, is light in weight to facilitate rapid acceleration and precise alignment of the head with respect to a recording track is obviated by the relatively wide recording and narrow reading characteristics of the head.

While the invention has been particularly shown and described with reference to a preferred embodiment thereof, it will be understood by those skilled in the art that various changes in form and detail may be made therein without departing from the spirit and scope of the invention.

What is claimed is:

1. A magnetic head for recording and reading information on a magnetic recording medium comprising a magnetic core having a pair of spaced faces providing a gap, said faces having a predetermined width, a pair of spaced magnetic members disposed between said faces in said gap and each having a width less than one-half of said predetermined width, whereby said members are effective to bypass a major proportion of magnetic flux between said faces for magnetomotive forces less than a predetermined value applied to said core and to saturate and bypass a proportion of flux between said faces for magnetomotive forces significantly greater than said predetermined value applied to said core.

2. A magnetic head for recording and reading information on a magnetic medium comprising a magnetic core having a pair of spaced faces providing a gap, said faces having a height and a width, a pair of spaced magnetic shunt members disposed between said faces each having a width less than one-half the width of said faces and a height less than the height of said faces, each of said shunts being remote from an edge of each pole face whereby said shunts are effective to bypass magnetic flux between said faces and said core may be worn at said edges without wearing said members.

3. A magnetic head for recording and reading information on a magnetic medium comprising a magnetic core having a pair of spaced faces forming a nonmagnetic gap across which a magnetic flux is produced, an outer surface portion of said core forming a pole face adaptable to be moved over the surface of a recording medium, means near opposite ends of said gap forming a low reluctance path for magnetic flux, said means being removed from said pole face whereby said pole face may be worn without subjecting said means to wear.

4. A magnetic head for recording and reading information recorded on a magnetic medium comprising a magnetic core having a pair of spaced faces forming a gap having a magnetic permeability substantially equal to unity and a member disposed at each end of said gap and having a magnetic permeability greater than unity and providing a low reluctance path between portions of said faces.

5. A magnetic head for recording and reading information on a magnetic recording medium comprising a magnetic core having a pair of spaced faces providing an air gap therebetween, said faces being substantially coextensive and having a predetermined width and height, a pair of members each having a height less than said predetermined height and a width less than one-half said predetermined width, said members being disposed between said faces at opposite extremities of the widths thereof and removed from one edge of the height thereof, said members each having a magnetic permeability greater than one whereby magnetic flux less than a predetermined value effectively bypasses said gap and passes through said members and magnetic flux in excess of said predetermined value passes between said faces across said gap other than through said members.

6. A magnetic head for recording and reading information on a magnetic recording medium comprising a magnetic core having a pair of outer portions and an intermediate portion spaced from each of the outer portions by nonmagnetic members, said core having a pair of spaced, opposing faces forming a nonmagnetic gap, a pair of magnetic members, each of said members being disposed between the faces of one of said outer portions, each of said members having a height less than the height of said face and being removed from one edge thereof.

References Cited by the Examiner

UNITED STATES PATENTS

| | | | |
|---|---|---|---|
| 2,532,100 | 11/50 | Howell | 179—100.2 |
| 2,694,109 | 11/54 | Wiegand | 179—100.2 |
| 2,928,079 | 3/60 | McNutt | 179—100.2 |
| 2,963,690 | 12/60 | Holman | 179—100.2 |

IRVING L. SRAGOW, *Primary Examiner.*